United States Patent
Parakka

(10) Patent No.: US 8,760,153 B2
(45) Date of Patent: Jun. 24, 2014

(54) HIGH RESOLUTION ABSOLUTE ORIENTATION ROTARY MAGNETIC ENCODER

(75) Inventor: Anthony Parakka, Rockford, IL (US)

(73) Assignee: Dexter Magnetic Technologies, Inc., Elk Grove Village, IL (US)

( * ) Notice: Subject to any disclaimer, the term of this patent is extended or adjusted under 35 U.S.C. 154(b) by 169 days.

(21) Appl. No.: 13/404,263

(22) Filed: Feb. 24, 2012

(65) Prior Publication Data
US 2012/0217956 A1      Aug. 30, 2012

Related U.S. Application Data

(60) Provisional application No. 61/446,100, filed on Feb. 24, 2011.

(51) Int. Cl.
*G01B 7/30*      (2006.01)

(52) U.S. Cl.
USPC .................................................. 324/207.25

(58) Field of Classification Search
USPC ............ 324/207.25, 207.23, 207.14, 207.11, 324/200
See application file for complete search history.

(56) References Cited

U.S. PATENT DOCUMENTS

| | | | | |
|---|---|---|---|---|
| 6,011,390 A | * | 1/2000 | Loreit et al. | 324/207.21 |
| 2010/0176799 A1 | * | 7/2010 | Ausserlechner | 324/207.2 |
| 2010/0225309 A1 | * | 9/2010 | Takahashi et al. | 324/207.25 |

OTHER PUBLICATIONS

Lou Law, Angular Position Sensing with 2-Axis Hall ICs, Mar. 11, 2003, GMW Associates, http://www.gmw.com/magnetic_sensors/sentron/2sa/documents/AN_101.pdf.*

* cited by examiner

*Primary Examiner* — Bot Ledynh
(74) *Attorney, Agent, or Firm* — Richard A. Fagin

(57) ABSTRACT

A rotary encoder includes a magnet disposed on a rotational axis of the encoder. The magnet is polarized transversely to the rotational axis. A first magnetic sensor is disposed on the rotational axis proximate the on-axis magnet. A magnet ring is disposed rotationally coaxially with the rotational axis and has a selected diametric distance from the axis. The magnet ring has a plurality of alternatingly polarized magnets. A number of pole pairs in the magnet ring is selected to match an angular resolution of the first magnetic sensor. A second magnetic sensor is disposed proximate the magnet ring.

3 Claims, 2 Drawing Sheets

HIGH RESOLUTION ABSOLUTE ORIENTATION ROTARY MAGNETIC ENCODER

CROSS-REFERENCE TO RELATED APPLICATIONS

Priority is claimed from U.S. Provisional Application No. 61/446,100 filed on Feb. 24, 2011. The foregoing application is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The invention relates generally to the field of rotary orientation encoders. More specifically, the invention relates to rotary encoders having high angular resolution and absolute orientation determination capability.

2. Background Art

Rotary encoders provide information about the angular position of rotating device with respect to a selected reference. One type of such encoder uses one or more magnets rotatably mounted with respect to a magnetic field sensor. When the magnet is mounted to a shaft, for example, the sensor provides a signal related to the rotation angle of the shaft with respect to the sensor. There are two type of magnetic rotary encoders, on-axis and off-axis type.

In on-axis magnetic rotary encoders, an example of which is shown at 10 in FIG. 1, a diametrically magnetized magnet 14 is placed on the end of a shaft (not visible in FIG. 1, but affixed to baseplate 12), with a sensor 16 mounted on the coaxially with the shaft and in close proximity to the magnet 14. Analysis of the magnetic field from multiple sense elements within the sensor 16 is used to estimate orientation angle of the magnetic field from the magnet 14 with respect to the sensor 16. On-axis rotary encoders typically provide 8 bits to 12 bits of resolution ($2^8$=256 steps per revolution, $2^{12}$=4096 steps per revolution) and can provide absolute orientation information, i.e., rotary orientation information is directly related to the angle between a line connecting the north to south poles of the magnet 14 and the sensitive axis of the sensor 16. Rotary orientation information is immediately available on application of power to the sensor 16.

In an on-axis sensor, however, the angular resolution however is limited by signal levels within the sensor 16 and the ability of associated signal processing circuitry to covert small voltages induced in the sensing elements to orientation information with sufficient accuracy.

An off-axis encoder is shown generally at 20 in FIG. 2. In the off-axis encoder 20, a magnet ring 22 with alternating north and south poles (not shown separately) may be mounted on a shaft (not shown for clarity of the illustration), with a sensor 24 mounted in close proximity to the magnet ring 22. Analysis of the magnetic field from multiple sensing elements within the sensor 24 is used to estimate the sensor 24 position with respect to the closest pair of magnetic poles (not shown separately) on the magnet ring 22.

Using the encoder 20 configured as shown in FIG. 2, rotary orientation can be measured to a resolution determined by the sensor's resolution per pole pair and the number of poles pairs on the magnet ring 22. For example, a magnet ring 22 with ten magnet pole pairs used with a sensor 24 providing 160 point resolution per pole pair, can effectively provide 1600 point resolution within a full rotation of the magnet ring 22.

The information available from an off-axis sensor 24, however, is related only to its position with respect to the closest pole pair. Information as to absolute rotational orientation of the magnet ring is not available. The off-axis encoder 20 is therefore unable to provide absolute orientation with respect to selected reference.

As a result, in order to obtain absolute rotational orientation information from an off-axis encoder, up on application of power the magnet ring 22 must first be rotated to a known reference position (i.e., "homed"), and the encoder reading recorded in memory. Then all subsequent encoder readings must be referenced against the reference position recorded in memory. The foregoing process is tedious. Further, in case the magnet ring rotational orientation changes during a subsequent power loss or power off condition, the change in orientation may not be recorded. Therefore, upon power up, orientation detected by the sensor 24 may be in error, necessitating another homing operation.

There is a need for a rotary encoder having high angular resolution and absolute rotational orientation information available from a single device.

SUMMARY OF THE INVENTION

A rotary encoder according to one aspect of the invention includes a magnet disposed on a rotational axis of the encoder. The magnet is polarized transversely to the rotational axis. A first magnetic sensor is disposed on the rotational axis proximate the on-axis magnet. A magnet ring is disposed rotationally coaxially with the rotational axis and has a selected diametric distance from the axis. The magnet ring has a plurality of alternatingly polarized magnets. A number of pole pairs in the magnet ring is selected to match an angular resolution of the first magnetic sensor. A second magnetic sensor is disposed proximate the magnet ring.

Other aspects and advantages of the invention will be apparent from the following description and the appended claims.

DETAILED DESCRIPTION

Figure 1:
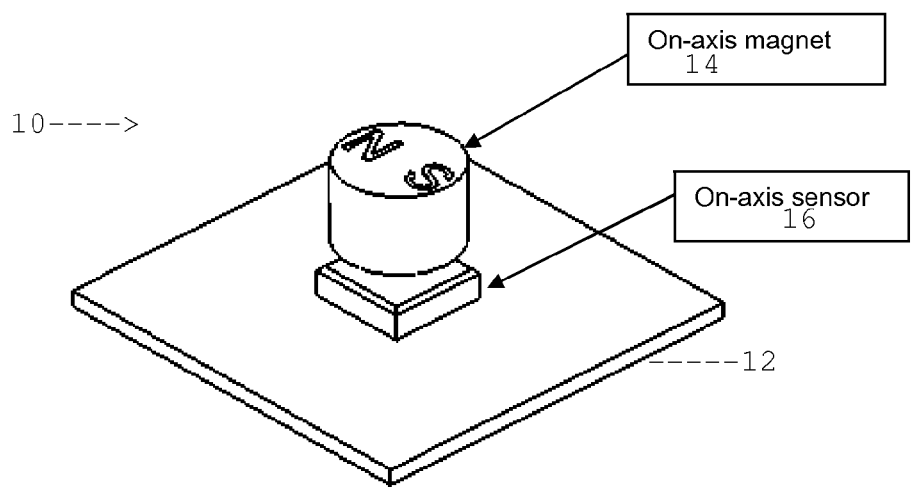
FIG. 1 shows a prior art on-axis magnetic rotary encoder.
Figure 2:
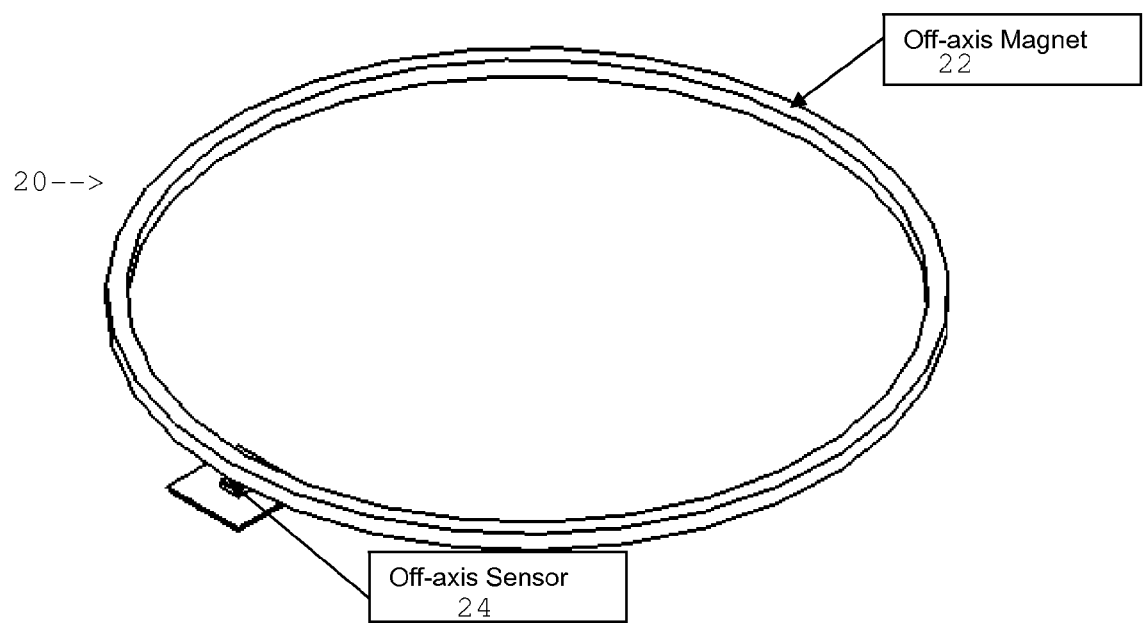
FIG. 2 shows a prior art off-axis magnetic rotary encoder.
Figure 3:
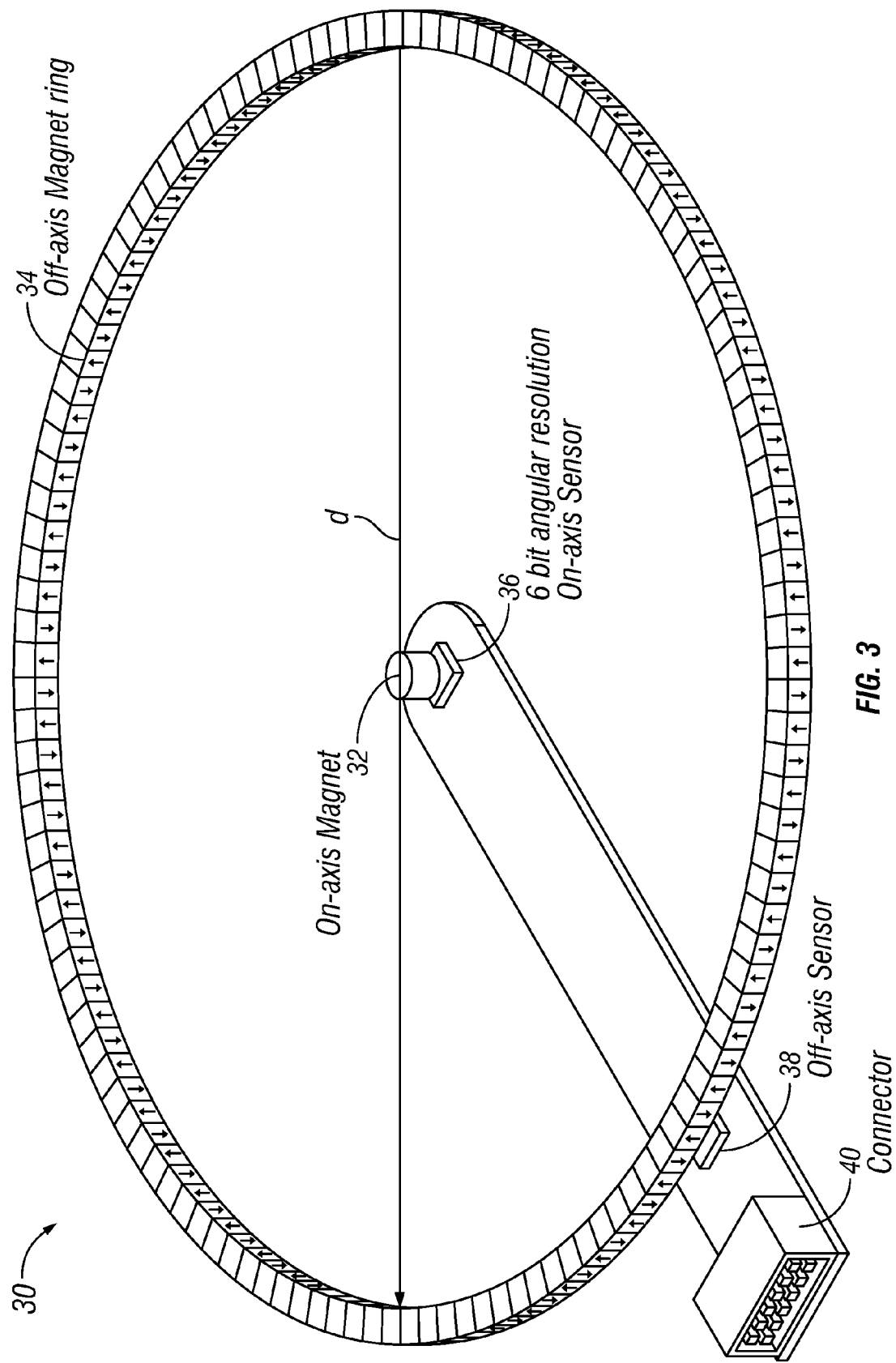
FIG. 3 shows an example of a magnetic rotary encoder according to the invention.

A general representation of a rotary magnetic encoder is shown in FIG. 3 at 30. The encoder 30 includes an on axis magnet 32 and associated on axis sensor 36. The encoder also includes an off axis magnet ring 34 with opposed pole magnets (not shown separately) and an associated off-axis sensor 38. The magnet ring 34 may be rotationally coupled to the on-axis magnet 32 or to the rotary input thereto so as to rotate at same speed as the on axis magnet 32. The encoder 30 uses the absolute orientation information from the on-axis sensor 36 and combines its resolution (multiplicatively) with the resolution available from the off-axis magnet ring 34 and off-axis sensor 38.

An important aspect of the structure shown in FIG. 3 is to match the number of pole pairs on the off-axis magnet ring 34 with the resolution of the on-axis sensor 36. By matching resolution to the number of pole pairs, the encoder 30 can provide absolute angular orientation information with the combined resolution of the two sensors 36, 38. The realization of such combined resolution is only possible with matching as described above.

Further, because the orientation information from the on-axis sensor 34 is absolute with respect to the on-axis magnet 32 and is not dependent on stored information, absolute rotary orientation information is available immediately when power to receiving/detecting circuits (not shown) is turned on.

Two examples are described below, the first provides up to 18 bits of resolution (i.e. $360/2^{18}$=0.001373291 degrees) and the second provides up to 24 bits of resolution (i.e. $360/2^{24}$=0.0000214 or $2.14 \times 10^{-5}$ degrees). Lower resolution devices are also possible.

Example 1

An encoder providing absolute position information with 18 bits of resolution combines an 6 bit resolution on-axis sensor (64 steps or output signals per revolution), shown as "six bit angular resolution" encoder at numeral 36 in FIG. 3, with a 64 magnet pole pair magnet ring having a selected diametric distance indicated by "d" in FIG. 3 and an off-axis sensor with twelve bit resolution (4096 steps per pole pair) disposed below the off axis sensor 38 as shown in FIG. 3. In the foregoing combination, the on-axis sensor 36 provides absolute angular position information with 360/64=5.625° resolution. Because the magnet ring has 64 pole pairs, each pole pair precisely covers 5.625°. The off-axis sensor 38 then provides absolute position information within each pole pair to a resolution 5.625/4096=0.001373291 degrees. This is equal to $360/2^{18}$ degrees and may be represented as 18 bits of resolution.

A high accuracy absolute encoder with 18 bit resolution as described in this example can be implemented using off-the-shelf sensors such as AS5145 for on-axis sensing and AS5311 for off-axis sensing, both from Austriamicrosystems, and off-the-shelf magnets such as p/n 2910041, a 0.236" diameter×0.098" thick diametrically polarized magnet from Dexter Magnetic Technologies for on-axis sensing, and 1 mm pole length multi-pole magnet strip (0.125" wide×0.03" thick×5.039" length) also available from Dexter Magnetic Technologies, wrapped on a 1.6041 inch diameter ring.

Example 2

An encoder providing absolute position information with 24 bits resolution combines a 12 bit resolution on-axis absolute sensor (4096 steps/revolution) with a 4096 pole pair magnet ring and a 12 bit resolution off-axis sensor. Following similar calculation as in Example 1, the present example encoder can provide absolute rotation position to 24 bits of resolution, i.e. 0.0000214 degree.

Understanding the resolution numbers: The foregoing resolution numbers are small and their significance can be better understood by considering them in view of certain physical parameters.

First, consider the resolution in terms of sensor voltage output pulses (counts) per degree of encoder rotation. A 20 bit resolution encoder provides 2094 encoder counts per degree of rotation, i.e., one degree divided 2094 times. A 24 bit resolution encoder provides 46728 counts per degree using the same form of calculation.

By comparison, consider an 8 bit resolution encoder over a full encoder rotation (i.e., 256 steps over 360°). 8 bit resolution of the typical on-axis encoder cannot resolve one degree. A 10 bit resolution encoder (1024 steps over 360°) provides 2.8 counts per degree. A 12 bit resolution encoder provides 11.377 counts per degree of rotation.

Next, consider the above resolution values in terms of resolving distance at the circumference of a 10 millimeter radius disc turning about its axis. A 20 bit resolution encoder resolves the circumference to 0.06 micrometers (μm). A 24 bit resolution encoder resolves the circumference to 3.73 nanometers (nm). By comparison, consider than an 8 bit resolution encoder resolves the circumference to 245.4 micrometers, and a 12 bit resolution encoder resolves the circumference to 15.3 micrometers. An average human hair of diameter of 0.05 mm held at a distance of 10 mm from the center of rotation covers and angle of 0.2865 degrees. With a 20 bit resolution encoder, the angle covered by the average human hair can be resolved into 834 divisions. With a 24 bit resolution encoder, the same angle can be divided into 13,351 divisions.

Some non-limiting uses for a high resolution rotary encoder according to the invention include the following Medical: With increasing use of robotics for remote surgery techniques, extremely well controlled movement of remotely controlled implements have become essential. This may be in the areas such as ophthalmology or neurology where manipulation of retinal cells or nerve endings require movements with microscopic resolution. In order to effect these movements, which are far finer than is possible with a human hand with eye coordination, computers are used to move actuators in concert with feedback from suitable sensors. High resolution encoders can assist the computer, and therefore the surgeon, in effecting such very fine movements.

Semiconductor fabrication: Systems for fabrication of semiconductor devices rely on of fine movement of the silicon wafer and manipulator arms. These movements are regulated by means of position feedback. High resolution encoders by virtue of their noncontact nature are suitable in these applications since they reduce contamination from wear products.

Aerospace: High resolution angular position feedback can be used for precise targeting and for antenna positioning.

Satellite telemetry: Satellite communication antenna dishes need to precisely track orbiting satellites. Satellite trajectory combined with precise angle feedback from a sensor mounted to the antenna and power spectrum from the antenna can assist precise tracking.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A rotary encoder, comprising:
   a magnet disposed on a rotational axis of the encoder, the magnet polarized transversely to the rotational axis;
   a first magnetic sensor disposed on the rotational axis proximate the magnet disposed on the rotational axis;
   a magnet ring disposed rotationally coaxially with the rotational axis and having a selected diametric distance from the rotational axis, the magnet ring having a plurality of alternatingly polarized magnets, a number of pole pairs in the magnet ring resulting from the alternatingly polarized magnets selected to match an angular resolution of the first magnetic sensor; and
   a second magnetic sensor disposed proximate a flat surface of the magnet ring, the second magnetic sensor having a selected angular resolution, whereby a combination of signals from the first magnetic sensor and the second magnetic sensor comprises an angular resolution of the first magnetic sensor divided by the angular resolution of the second magnetic sensor and an absolute angular orientation, the angular resolution of each of the first and second magnetic sensors defined, respectively as a number of sensor counts per revolution of the magnet disposed on the rotational axis and the magnet ring.

2. A method for generating encoding information related to rotation of a device, comprising:

rotating a magnet polarized transversely to an axis of rotation of the device;

detecting a magnetic field proximate the transversely polarized magnet;

rotating a plurality of alternatingly polarized magnets disposed at a selected distance from and at a same rotational speed as the transversely polarized magnet, a number of pole pairs in the alternatingly polarized magnets selected to match an annular resolution of a sensor used to detect the magnetic field proximate the transversely polarized magnet;

detecting a magnetic field proximate the plurality of alternatingly polarized magnets; and combining the detected magnetic field from the transversely polarized magnet and the plurality of alternatingly polarized magnets to obtain absolute angular position rotary orientation information of the transversely polarized magnet, the angular resolution of the magnetic sensor defined as a number of sensor counts per revolution of the transversely polarized magnet.

3. The method of claim 2 wherein an absolute rotary position of the transversely polarized magnet is determined an angular resolution of the sensor used to detect the magnetic field of the transversely polarized magnet divided by an angular resolution of the sensor used to detect the magnetic field from the plurality of alternatingly polarized magnets.

* * * * *